United States Patent Office 3,262,653
Patented July 26, 1966

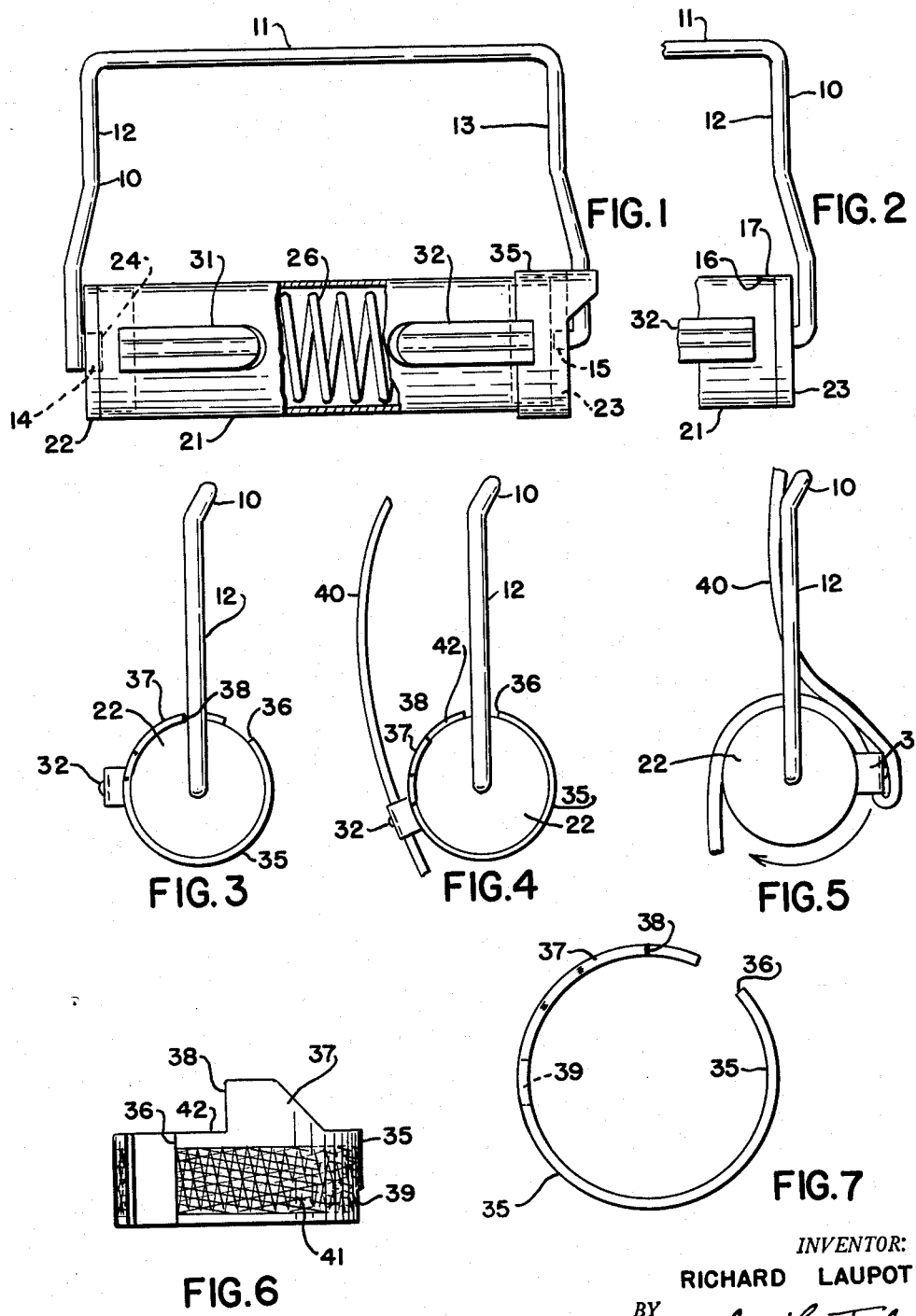

3,262,653
LOCK FOR SAFETY BELT TAKE UP REEL
Richard Laupot, New York, N.Y., assignor to Retract-A-Belt Corp., a corporation of New York
Filed Aug. 21, 1964, Ser. No. 391,199
2 Claims. (Cl. 242—107.11)

This invention relates, in general, to take up reels for taking up slack portions of automobile seat or safety belts when the belts are not in use. More particularly, this invention relates to a lock to prevent a given type of take up reel from rotating before it is positioned on a seat belt.

An object of this invention is to provide a more easily used safety belt take up reel.

Another object of this invention is to provide a lock for a safety belt take up reel, the lock being less likely to be inadvertently released by a user.

A further object of this invention is to provide a lock for an automobile seat belt take up reel which requires a manipulation of the take up reel before the lock can be released.

Still another object of this invention is to provide a more positive lock for an automobile seat belt take up reel.

Many other objects, advantages and features of invention reside in the particular construction, combination and arrangement of parts involved in the embodiment of this invention and its practice as will be understood from the following description and accompanying drawing wherein:

FIGURE 1 is a front view of an automobile seat belt take up reel with a central portion broken away in section to show interior construction and with a lock according to this invention fixed on one side;

FIGURE 2 is a front view of a fragment of one side of the seat belt take up reel of FIGURE 1 with the lock removed;

FIGURE 3 is an end view of the seat belt take up reel with the lock in position;

FIGURE 4 is an end view of the seat belt take up reel with the reel body rotated so the lock may be removed and with a fragment of a seat belt positioned under the arms projecting from the reel body;

FIGURE 5 is an end view of the seat belt take up reel with the lock removed and with the reel body shown rotating to take up slack in a fragment of a seat belt; and FIGURES 6 and 7 are side and top views, respectively, of the seat belt take up reel lock.

Referring to the drawing in detail, FIGURES 1 and 2 show a take up reel on which the lock of this invention may be used. Such a take up reel consists of a wire yoke 10 having a top portion 11 and side portions 12 and 13. Side 12 terminates in an inward projection formed into the flattened lug 14 and side 13 terminates in an inward extending end 15. A metal reel body 21, which is generally cylindrical in shape, has the plastic end plugs 22 and 23 inserted into its ends. End plug 22 contains a rectangular aperture 24 within which lug 14 seats to prevent rotation of plug 22 relative to side 12. End 15 of side 13 extends into a cylindrical aperture in plug 23 so that plug 23 may freely rotate relative to side 13.

As is further shown in FIGURES 1 and 2, reel body 21 contains a notch 16 and plug 23 has a lug 17 extending therefrom which extends into notch 16. A helical spring 26 is fixed to the plugs 22 and 23 to rotate plug 22 relative to plug 23. Since lug 14 fixes plug 22 to yoke 10 and lug 17 fixes plug 23 to reel body 21, the spring 26 rotates reel body 21 within yoke 10. Arms 31 and 32 project outward from the extend inward from the ends of reel body 21. The webbing of a safety belt may be worked under these arms to be secured by them. The safety belt take up reel construction hereinbefore described is old and well known.

A locking ring, as shown in FIGURES 6 and 7, contains a longitudinal slit or opening 36 and has a longitudinal projection 37 formed adjacent to opening 36. The locking ring itself is designated by the numeral 35. The projection 37 has an edge 38 facing the opening 36. Disposed in the other end of locking ring 35 is a notch 39 which is wide enough to fit about the outer end of arm 32.

When the take up reel and lock of this invention are bought by a user, they are assembled as shown in FIGURES 1 and 3. Reel body 21 is wound in relation to yoke 10 so that spring 26 tends to rotate reel body 21 within yoke 10. Locking ring 35 is positioned about the end of reel body 21 and plug 23 so that the outer end of arm 32 fits in notch 39. Edge 38 butts against side portion 13 to prevent rotation of reel body 21 in yoke 10. Thus the locking ring 35 of this invention locks the reel body 21 against rotation.

Other locking devices have been used with safety belt take up reels of the type herein described. These are usually in the form of a pin or clip extending from an aperture in plug 23 to contact side portion 13. Such a pin or clip, despite printed warnings to the contrary, is very often removed by a purchaser allowing the reel body 21 to unwind rapidly before it is fixed to seat belt webbing. This may cause damage to the spring 26 or the purchaser may over-wind the reel body 21 to damage spring 26.

The locking ring 35 of this invention is used as follows. As shown in FIGURE 4, a seat belt portion 40, which is to be taken up, is inserted under the arms 31 and 32. The locking ring 35 is then removed so that the seat belt portion 40 is wound up on the reel body 21 as shown in FIGURE 5. However, locking ring 35 may only be removed by rotating the reel body 21 against spring tension until slit 36 is aligned with side portion 13. This allows the locking ring 35 to be withdrawn to release the take up reel. The outer surface 41 of the locking ring 35 may be knurled so that it may be more easily grasped for removal.

The edge 42 of the locking ring 35 which is disposed between edge 38 and slit or opening 36 prevents locking ring 35 from being slid outward on the take up reel as it contacts side portion 13 unless reel body 21 is rotated to align slit 36 with side portion 13. Thus a purchaser may not accidentally pull locking ring 35 from the take up reel before reading instructions which tell him to first fix the take up reel to a safety belt. Further, the take up reel lock of this invention is more positive than any others heretofore used.

While this invention has been shown and described in the best form known, it will nevertheless be understood that this is purely exemplary and that modifications may be made without departing from the spirit and scope of the invention except as it may be more limited in the appended claims wherein I claim:

1. A lock for a safety belt take up reel, said take up reel comprising a yoke having a top portion and side portions extending downward from said top portion, a cylindrical reel body having two ends, means rotatively securing said reel body between said side portions of said yoke, spring means rotating said reel body within said yoke, and arms extending radially outward, and inward from the ends of said reel body to secure a safety belt to said reel body; said lock comprising a ring slipped over one end of said reel body, said ring containing an opening through which a side portion of said yoke may pass, said ring having inner and outer edges, said inner edge of said ring being formed to extend past one of said arms of said reel body to engage the arms, said ring having a projection extending from said outer edge a distance from said opening, said outer edge of said ring between said projection and said opening being adjacent to one of said side portions of said yoke, said projection being forced against the side portion of said yoke.

2. A lock for a safety belt take up reel, said take up reel comprising a yoke having a top portion and side portions extending downward from said top portion, a cylindrical reel body having two ends, means rotatively securing said reel body between said side portions of said yoke, spring means rotating said reel body within said yoke, and arms extending radially outward, and inward from the ends of said reel body to secure a safety belt to said reel body; said locking comprising a cylindrical ring slipped over one end of said reel body, said ring containing a longitudinal opening through which a side portion of said yoke may pass, said ring having inner and outer edges, said ring containing a notch cut out to extend inward from said inner edge and having one of said arms of said reel body extend radially through said notch, said ring having a projection extending from said outer edge near said longitudinal opening, said outer edge of said ring between said projection and said opening being adjacent to one of said side portions of said yoke, said projection being forced against the side portion of said yoke.

References Cited by the Examiner

UNITED STATES PATENTS

| | | | |
|---|---|---|---|
| 486,604 | 11/1892 | Porter | 242—107.11 |
| 669,809 | 3/1901 | Schwab | 242—107.6 |
| 3,223,236 | 12/1965 | Troendly | 242—107.11 |

FOREIGN PATENTS 809,901  8/1951  Germany.

MERVIN STEIN, *Primary Examiner.*

W. S. BURDEN, *Assistant Examiner.*